Oct. 27, 1959 M. J. MANETTI ET AL 2,910,687
REMOVABLE CLOSURE MEMBER FOR TELEVISION CABINETS
Filed June 2, 1958 2 Sheets-Sheet 1

INVENTOR.
Mario Manetti
BY Fred Manetti
Samuel W. Kipnis
Atty.

Oct. 27, 1959 M. J. MANETTI ET AL 2,910,687
REMOVABLE CLOSURE MEMBER FOR TELEVISION CABINETS
Filed June 2, 1958 2 Sheets-Sheet 2
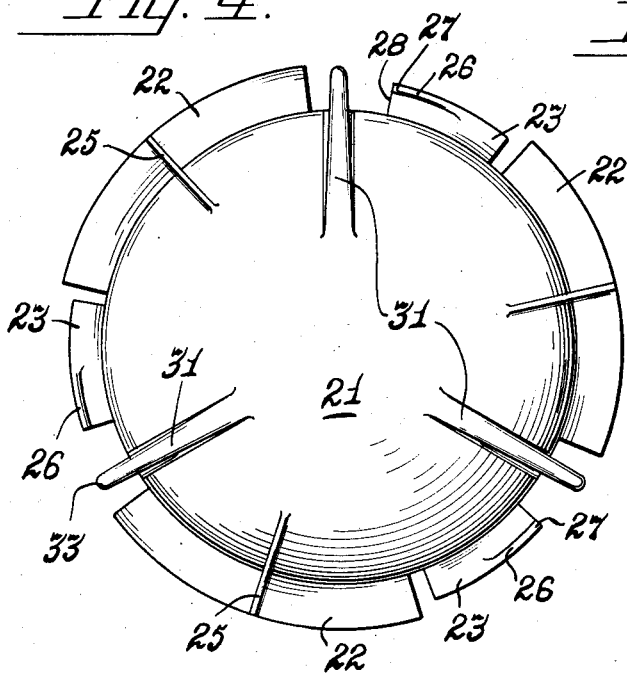
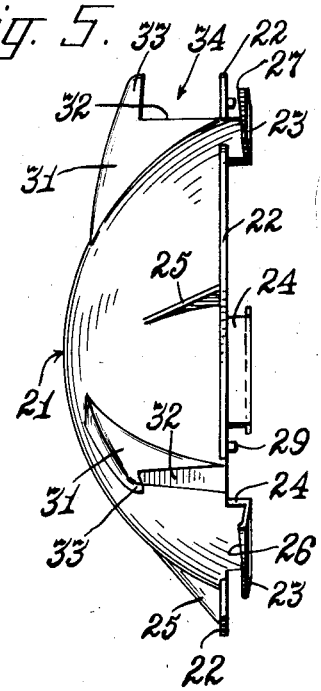
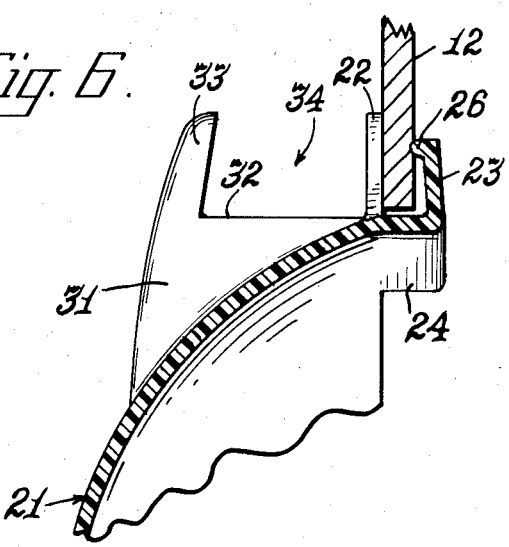
INVENTOR.
Mario Manetti
BY Fred Manetti
Samuel W. Kipnis
Atty.

United States Patent Office

2,910,687
Patented Oct. 27, 1959

2,910,687

REMOVABLE CLOSURE MEMBER FOR TELEVISION CABINETS

Mario J. Manetti and Fred Manetti, Chicago, Ill.

Application June 2, 1958, Serial No. 739,260

4 Claims. (Cl. 340—367)

The invention relates generally to improvements in closures for the back panel or wall of a television cabinet and more particularly to a removable closure or cover member for the mounting base of a television tube that normally projects through an opening in the back wall or panel of its cabinet, which closure embodies novel means to facilitate its being carried into locked and unlocked positions on the panel and means to store the conventional electrical service cord.

The locking feature of the twist-lock type of closure member disclosed herein is substantially like that embodied in the removable closure disclosed and claimed in Manetti et al., Patent No. 2,818,559, issued December 31, 1957. The present structure, which constitutes an improvement over the prior disclosure, is characterized by having a plurality of mutually spaced radial protuberances on its outside surface which are manually engageable to facilitate rotation of the closure member while it is being mounted on or removed from the panel. The protuberances are of such configuration as to constitute novel support means around which the usual electrical service cord of the television set may be wound for storage.

It is therefore an object of the invention to provide a novelly constructed removable closure member for a television cabinet panel.

Another object is to provide a twist-lock type of panel closure member with novel integral means to facilitate its being locked and unlocked with respect to the panel.

Another object is to provide a panel closure member with a novel structure adapted to receive the usual electrical service cord wound thereon.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of the invention, there is illustrated in the accompanying drawings, preferred embodiments thereof, from an inspection of which, when considered in connection with the following description, the invention, its mode of construction, assembly and operation, and many of its advantages should be readily understood and appreciated.

Referring to the drawings in which the same characters of reference are employed to indicate corresponding or similar parts throughout the several figures of the drawings:

Fig. 4 is an outside or back view of the closure member.

Fig. 5 is a side elevational view thereof.

Fig. 6 is an enlarged fragmentary sectional view of the closure member, showing it mounted.

Figure 1:
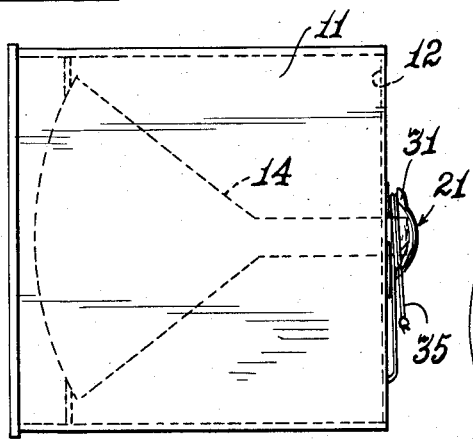
Fig. 1 is a diagrammatic side view of a television receiver cabinet, showing the closure member mounted on the back panel thereof.
Figure 2:
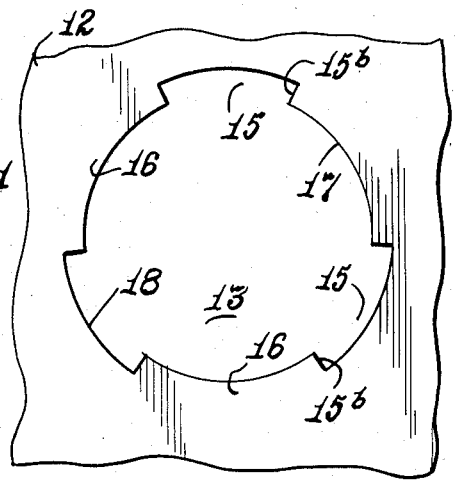
Fig. 2 is a fragmentary back view of the back panel with the closure member removed.
Figure 3:
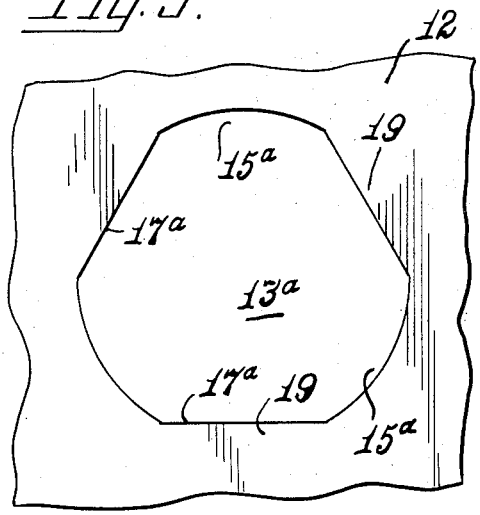
Fig. 3 is a similar back view of a slightly modified form of back panel.

Referring to the accompanying drawings and particularly to Figs. 1 and 2, the television cabinet 11 includes a back panel 12 having an opening 13 therein through which the mounted base end of a television tube 14 projects. The opening 13 is substantially circular and its peripheral edge is configurated to provide mutually spaced arcuate notches or recesses 15 and intermediate arcuate areas 16, the latter having their edges 17 located inwardly radially of the edges 18 of the recesses 15. In the alternate, the opening may be formed substantially as shown in Fig. 3, wherein the circular opening 13a is restricted in mutually spaced cordal areas 19 by substantially straight edges 17a so as to leave enlarged open areas 15a. These and other possible modifications of the opening configuration afford means in the panel for co-operating with means, now to be described, formed in a closure member 21 for detachably securing said closure member over the opening 13 or 13a by a twist-lock arrangement.

The closure member 21 is of thin wall construction, preferably molded plastic material, and preferably is substantially semi-spherical or dish-shaped as shown; but it may be substantially cup-shaped or otherwise formed to cover the panel opening and embrace and enclose the rearwardly protruding base of the television tube 14.

The free peripheral edge of said closure member has formed integral therewith a plurality of outwardly radially extending mutually spaced arcuate main flanges 22 and mutually spaced intermediate arcuate counterflanges 23 also extending outwardly radially. The number of flanges and counterflanges corresponds to the number of arcuate recesses 15 or open areas 15a in the panel opening. The counterflanges 23 are spaced forwardly of the edge of the closure member by wall extensions 24 of sufficient width to locate the back surfaces of the counterflanges 23 at a distance from the front faces of the main flanges 22 that is substantially equal to the thickness of the panel 12.

The main flanges 22 are preferably made rigid with the wall of the closure member by means of a plurality of gusset ribs 25 interconnecting each main flange with the wall of the closure member; whereas, the counterflanges 23 preferably are flexibly attached relative to the front ends of the wall extensions 24, as best shown in Figure 6. By this expedient, the mounting of the closure member to the back panel 12 is improved. The mounting is further improved by the provision of a wedge-shaped rib 26 extending along the free margin of the central area of the back surface of each counterflange 23. Each rib has a high point 27 adjacent to one end 28 of the counterflange. This construction tends to induce some little flexing of the counterflanges 23 during the mounting of the cover and such flexing can be further facilitated by a construction wherein the counterflange 23 lies in a plane slightly inclined in the direction of the main flanges 22 as best shown in Figs. 5 and 6.

The closure member 21 can be installed on the back of the television cabinet 11 whether the tube 14 is in place or removed. In either case, the closure member is brought against the back surface of the panel 12 with the counterflanges 23 oriented to enter the arcuate notches 15 or enlarged areas 15a of the panel opening 13 or 13a. The front surface of the main flanges 22 will then abut the back of the panel areas 16 or 19 and the closure member then is rotated about its own axis in a direction with the low ends of the wedge-shaped ribs 26 leading, thereby causing engagement of the panel areas 16 or 19 between the main flanges and counterflanges. For this purpose, the main flanges 22 and panel areas 16 or 19 desirably have greater arcuate extension than do the counterflanges 23 and recesses 15 or enlarged aperture areas 15a.

Thus the closure member can be left in position with the high points 27 of the ribs 26 bearing somewhere in the inwardly projecting panel areas 16 or 19 and with the lateral end portions of the arcuate main flanges 22 in contact with the lateral end portions of said inwardly projecting panel areas. In this manner the panel opening 13 or 13a is closed and the base of the television tube is protected.

In order to remove the closure member 21 it is simply rotated in either direction until the ribs 26 ride off of the inwardly projecting panel areas, whereafter the member 21 can be withdrawn rearwardly from the panel 12. Reinsertion can be effected in the same manner as the original insertion.

Figure 7:
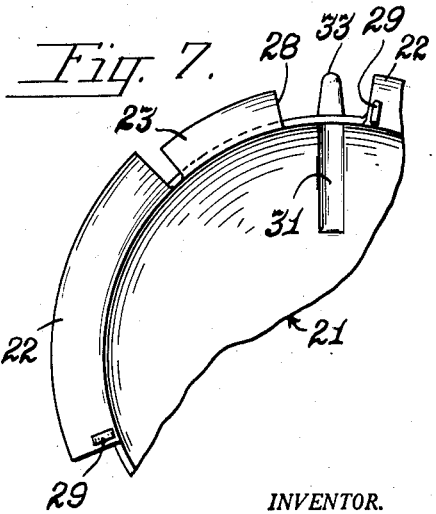
Fig. 7 is a fragmentary inside or front view of the closure member.

In some cases it is preferable to make the removal of the closure member 21 relatively difficult in order to prevent tampering with the tube. This may be accomplished by the provision of a friction stop member 29 (Fig. 7) projecting forwardly from the front surface of one or all of the main flanges 22 at one lateral end thereof, as shown. It will be understood that these stops, pursuant to rotation of the closure member come into contact with the opposing edges 15b of the corresponding arcuate recess 14a of Figure 2, thereby restraining further rotation of the closure member in the inserting direction.

To facilitate manual rotation of the closure member 21 while mounting it on or removing it from the panel 12, the outside surface of the body of said member is provided with a plurality of mutually spaced protuberances preferably in the form of radial ribs 31. Obviously, these ribs may be grasped or otherwise engaged by the fingers of one hand while rotating the closure member in either direction.

Each of the ribs 31 extends outwardly rearwardly and radially as shown, and each has an end edge 32 in substantial alignment with the peripheral edge of the closure member and a radially extending tongue 33 contiguous with its free edge. The tongues 33 and edges 32 define, with the main flanges 22, a plurality of circumferentially spaced recesses 34. When the closure member is in place on the television back panel, the circumferentially spaced recesses 34 provide means for receiving and retaining the usual television electrical service cord 35 wound thereon. This affords means for the convenient storage of said cord when its use is not required.

It is believed that the invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of the invention as defined in the appended claims.

What is claimed and desired to secure by Letters Patent of the United States is:

1. A removable closure member for an opening in the back wall of a television cabinet comprising a substantially semi-spherical body member, a plurality of arcuate main flanges peripherally spaced apart about and extending outwardly radially from adjacent to the peripheral edge of said member, a corresponding number of arcuate counterflanges peripherally spaced apart about and extending outwardly radially from said peripheral edge at peripheral positions located between those of the main flanges, said counterflanges being forwardly spaced relative to the main flanges by slight and substantially uniform distances so as to receive the back wall therebetween, and radial ribs on the outside face of the body member inwardly of the peripheral flanges to facilitate its being rotated to engage the back wall between the flanges and counterflanges.

2. A removable closure member for an opening in the back wall of a television cabinet comprising a dished body member, a plurality of arcuate main flanges peripherally spaced apart about and extending outwardly radially from adjacent to the peripheral edge of said member, a corresponding number of arcuate counterflanges peripherally spaced apart about and extending outwardly radially from said peripheral edge at peripheral positions located between those of the main flanges, said counterflanges being forwardly spaced relative to the main flanges by slight and substantially uniform distances so as to receive the back wall therebetween, a plurality of mutually spaced radial ribs on the outside face of the body member and inwardly of said peripheral flanges adapted to support an electric service cord wound thereon, and a radial projection on the outer end of each rib spaced rearwardly of the flanges to define with said flanges outwardly opening circumferentially spaced recesses for said cord.

3. A removable closure member for an opening in the back wall of a television receiver cabinet comprising a thin walled semi-spherical body member, means on said member and on said back wall engageable for retaining said member over the opening, said means comprising a bayonet-type fastening, and a plurality of mutually spaced radial ribs on the outside surface of said body member and inwardly of the retaining means to facilitate engagement for manual rotation of the body member for engaging and disengaging said retaining means.

4. A removable closure member for the back wall of a television cabinet comprising a substantially circular member having a plurality of mounting elements on its peripheral edge for co-operative engagement with the peripheral edge of an opening in said back wall, said elements being of a character that are engaged and disengaged with the panel upon relative rotation of said member and panel, and a plurality of protuberances on the outside face of said member engageable for assisting such rotation, said protuberances comprising mutually spaced radial ribs having shoulders on their ends defining with the mounting elements circumferential recesses to receive an electric service cord wound thereon.

References Cited in the file of this patent
UNITED STATES PATENTS 2,597,705   Clines   May 20, 1952
2,818,559   Manetti et al.   Dec. 31, 1957